United States Patent [19]

Takeda et al.

[11] Patent Number: 5,075,720

[45] Date of Patent: Dec. 24, 1991

[54] SLIT ILLUMINATION SYSTEM FOR COPYING MACHINE AND THE LIKE

[75] Inventors: Katsuhiko Takeda; Hitoshi Kageyama, both of Okazaki, Japan

[73] Assignee: Minolta Camera Kabushiki Kaisha, Osaka, Japan

[21] Appl. No.: 669,929

[22] Filed: Mar. 15, 1991

[30] Foreign Application Priority Data

Mar. 19, 1990 [JP] Japan .................... 2-69051

[51] Int. Cl.$^5$ .............................. G03B 27/54
[52] U.S. Cl. ..................................... 355/67
[58] Field of Search ............... 355/67, 71, 228, 233; 362/3, 16

[56]  References Cited

U.S. PATENT DOCUMENTS

| 3,947,115 | 3/1976 | Hamaguchi | 355/67 X |
| 3,982,116 | 9/1976 | Sakuma | 355/67 X |
| 4,239,383 | 12/1980 | Peterson | 355/67 |
| 4,259,711 | 3/1981 | Mochizuki | 355/67 X |
| 4,333,130 | 6/1982 | Mochizuki et al. | 355/67 X |
| 4,483,609 | 11/1984 | Harada | 355/67 X |
| 4,518,249 | 5/1985 | Murata et al. | 355/67 |
| 4,525,059 | 6/1985 | Haramaki | 355/67 X |
| 4,668,081 | 5/1987 | Imamura | 355/70 |
| 4,733,280 | 3/1988 | Irie | 355/67 |
| 4,809,043 | 2/1989 | Minami | 355/67 |
| 4,816,875 | 3/1989 | Takeda et al. | 355/67 |
| 4,851,975 | 7/1989 | Kanai | 355/67 X |

Primary Examiner—Richard A. Wintercorn
Attorney, Agent, or Firm—Price, Gess & Ubell

[57] ABSTRACT

A slit illumination system provided in an image forming apparatus of slit exposure type for slit-illumination of an original placed on a document glass table in the image forming apparatus. The slit illumination system is provided with a light source including an elongated exposure lamp to illuminate the original at a slit-illuminated position on the document glass table, a main reflecting mirror portion composed of first and second reflecting mirrors, and an auxiliary reflecting mirror portion composed of third and fourth reflecting mirrors. The first, second, third and fourth reflecting mirrors are respectively shaped to follow a part of first, second, third and fourth ellipsoids which are different in curvature from each other.

9 Claims, 2 Drawing Sheets

SLIT ILLUMINATION SYSTEM FOR COPYING MACHINE AND THE LIKE

BACKGROUND OF THE INVENTION

1. Field of the Invention

The present invention relates to a slit illumination system for copying machines and the like, and more particularly to a slit illumination system having high illumination efficiency and uniform illumination distribution.

2. Description of the Related Art

A conventional slit illumination system for a copying machine and the like is explained with reference to FIG. 1.

In FIG. 1, an original (not shown) is placed on a document glass table 6. A document surface 6a represents an upper surface of the document glass table 6. A slit illumination system 7 for illuminating the document surface 6a from the below is composed of an elongated exposure lamp 2 as a light source, a main reflecting mirror 1 and an auxiliary reflecting mirror 4 which encompasses the exposure lamp 2 with the main reflecting mirror 1.

The main reflecting mirror 1 includes four portions 1a to 1d. Each of the portions 1a and 1c is a part of an ellipsoid having its first focus at a slit-illuminated position 3 on the document surface 6a to be slit-illuminated and its second focus at the center of the exposure lamp 2. Each of the portions 1b and 1d is a part of an ellipsoid having its first focus at the center of the exposure lamp 2 and its second focus at a point 3' symmetrically to the slit-illuminated position 3 on the document surface 6a with respect to the auxiliary reflecting mirror 4.

Accordingly, the rays of light emitted from the exposure lamp 2 are condensed at the slit-illuminated position 3 as shown by leftwardly upward and rightwardly upward hatching in FIG. 1 in order to slit-illuminate the document surface 6a. An original image to be illuminated is directed from the slit-illuminated position 3 to a lens system (not shown) through a slit 5 formed between the main and auxiliary reflecting mirrors 1 and 4 and further to a photosensitive member, so that the photosensitive member is efficiently exposed.

Recently, the high-speed copying and the color copying are remarkably improved in electrophotographic copying machines, digital copying machines, printer, facsimile and the like. These improvements require a slit illumination system having a high illumination efficiency.

SUMMARY OF THE INVENTION

The main object of the present invention is to provide a slit illumination system having a high illumination efficiency.

The other object of the present invention is to provide a slit illumination system having a uniform illumination distribution in a slit width direction.

Further object of the present invention is to provide a small-sized slit illumination system.

These and other objects are achieved by providing a slit illumination system for slit-illumination of an original placed on a document glass table in a copying machine of slit exposure type, which comprises a light source including an elongated exposure lamp to illuminate the original at a slit-illuminated position on the document glass table, a first reflecting mirror disposed below the exposure lamp at one side of an image projecting optical path and shaped to follow a part of a first ellipsoid for directing the light emitted from the exposure lamp to the slit-illuminated position, a second reflecting mirror provided adjacently to the first reflecting mirror though a slit at the other side of the image projecting optical path and shaped to follow a part of a second ellipsoid for directing the light emitted from the exposure lamp to the slit-illuminated position, a third reflecting mirror above the exposure lamp at the same side of the image projecting optical path as the first reflecting mirror and shaped to follow a part of a third ellipsoid for directing the light emitted from the exposure lamp to the second reflecting mirror, and further to the slit-illuminated position, and a fourth reflecting mirror upwardly extending from the second reflecting mirror and shaped to follow a part of a fourth ellipsoid for directing the light emitted from the exposure lamp to the slit-illuminated position.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
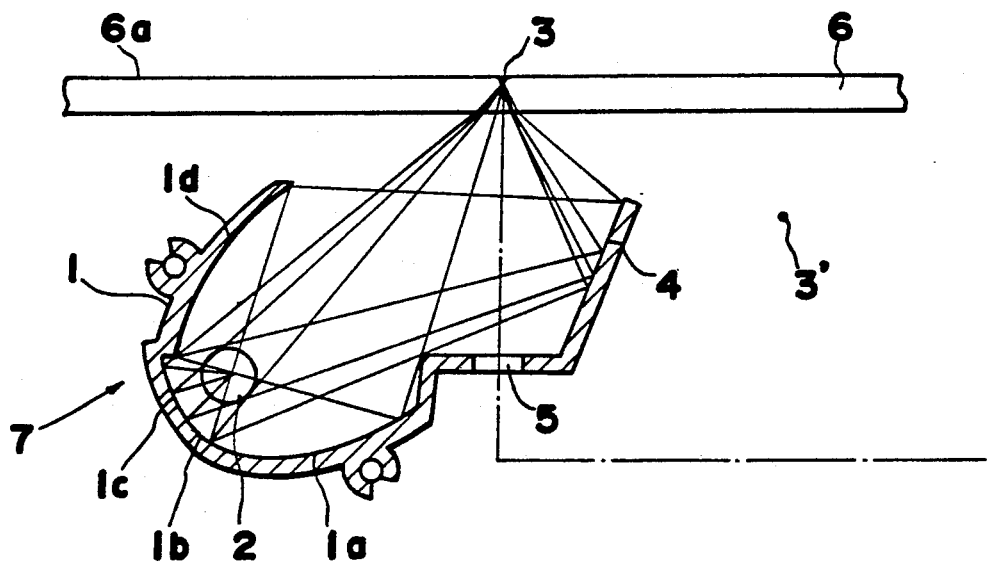
FIG. 1 is a cross-sectional view of a conventional slit illumination system.
Figure 2:
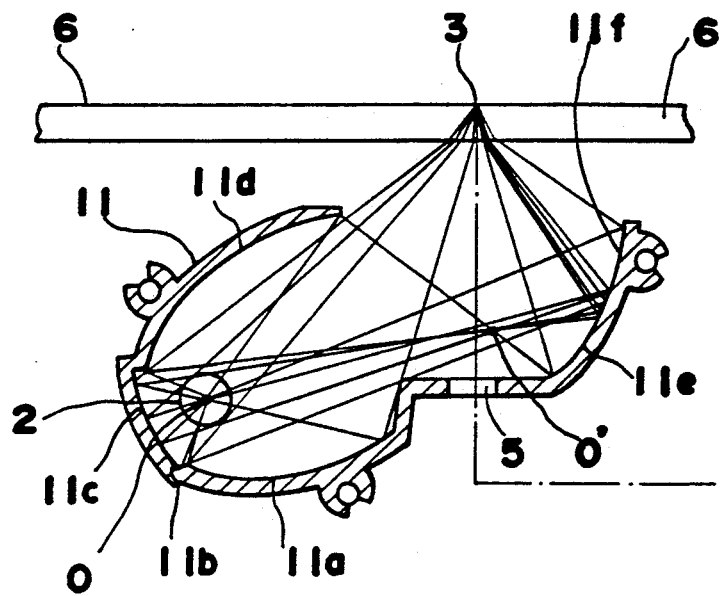
FIG. 2 is a cross-sectional view showing an embodiment of a slit illumination system according to the present invention.
Figure 3:
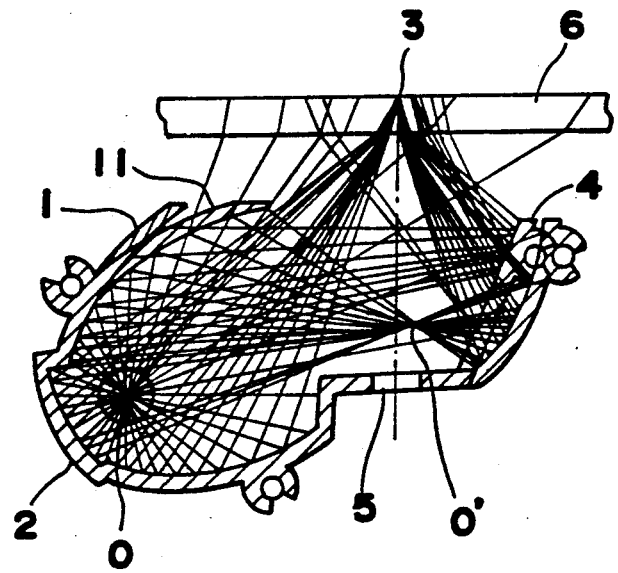
FIG. 3 is a cross-sectional view showing the state wherein the illumination system in FIG. 2 is lain upon the slit illumination system in FIG. 1 for the purpose of explaining the effect of the present invention.
Figure 4:
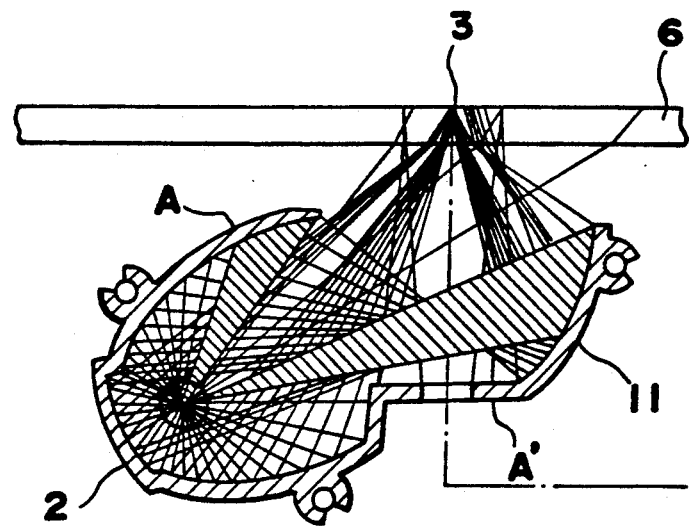
FIG. 4 is a cross-sectional view illustrating the effective bundle of the rays in the embodiment shown in FIG. 2.

Referring now to FIGS. 2 to 4, an embodiment of the present invention will be explained hereinafter.

FIG. 2 shows a slit illumination system of the embodiment according to the present invention, wherein a reflecting mirror 11 includes a main reflecting mirror portion encompassing an exposure lamp 2 as a light source and an auxiliary reflecting mirror portion formed integrally with the main reflecting mirror portion through a slit 5. The main reflecting portion encompassing the exposure lamp 2 is composed of reflecting surfaces 11a, 11b, 11c and 11d. Similarly to the conventional slit illumination system as described above, the reflecting surface 11a located below the exposure lamp 2 and the reflecting surface 11c located on the side of the exposure lamp 2 are respectively a part of an ellipsoid having its first focus at a slit-illuminated position 3 on an upper surface 6a of a document glass table 6 and its second focus at the center O of the exposure lamp 2.

While, the reflecting surface 11b located between the reflecting surfaces 11a and 11c and the reflecting surface 11d located above the exposure lamp 2 are respectively a part of an ellipsoid having its first focus at a point O' and its second focus at the center O of the exposure lamp 2.

The auxiliary reflecting mirror portion is composed of reflecting surfaces 11e and 11f. The reflecting surface 11e forming a lower portion of the auxiliary reflecting mirror portion is a part of an ellipsoid having its first focus at the slit-illuminated position 3 on the upper surface 6a of the document glass table 6 and its second focus at the center O'. The reflecting surface 11f upwardly extending from the reflecting surface 11e is a part of an ellipsoid having its first focus at the center O of the exposure lamp 2 and its second focus at the slit-illuminated position 3 of the upper surface 6a of the document glass table 6.

FIG. 3 is a cross-sectional view showing the state wherein the reflecting mirror 11 in the embodiment according to the present invention is lain upon the conventional main and auxiliary reflecting mirrors 1 and 4 while illustrating the optical path of the bundle of illumination light rays in the conventional slit illumination system and the slit illumination system according to the present invention. The reflecting mirror 11 has the reflecting surface 11d which overhangs the exposure lamp 2 longer than the reflecting surface 1d, so that the rays of illumination light can be efficiently condensed. It is to be noted here that an angle of reflection at the reflecting surface 11f is sharper in about 20 degrees than that at the reflecting surface of the conventional auxiliary reflecting mirror 4 composed of an plane mirror. As a result, the surface 11f can condense more rays of illumination light at the slit-illuminated position 3.

Further, although the conventional main reflecting mirror 1 could not efficiently condense the rays of light directly emitted from the exposure lamp 2 at the slit-illuminated position 3 because of the auxiliary reflecting mirror 4 composed of the plane mirror, the reflecting surfaces 11e and 11f each of which is a part of the ellipsoid can efficiently condense the rays of light directly emitted from the exposure lamp 2 at the slit-illuminated position 3 to illuminate the upper surface 6a of the document glass table 6.

Moreover, the common focus O' of the reflecting surfaces 11b, 11d and 11e, the center O of the exposure lamp 2, and reflecting surface 11e can be arranged in a substantially straight line. That is, the rays of light directly emitted from the exposure lamp 2 can be efficiently condensed at the slit-illuminated position 3 because the light directly emitted from the exposure lamp 2 passes through the vicinity of the common focus O'. In FIG. 4 are shown by hatching the bundle of rays A and A' in the portion wherein the bundle of illumination light rays emitted from the exposure lamp 2 are improved.

Consequently, in the slit illumination system according to the present invention the light-condensing efficiency improves thirty percent comparing with that in the conventional slit illumination system. In addition, the upper portion of the reflecting mirror in the present invention overhangs the exposure lamp 2, resulting in that rays of light unavailable to the exposure are cut and the rise of temperature on the document surface is prevented.

Furthermore, in the slit illumination system of the present invention as hereinbefore described, the illumination distribution is uniform because the exposure amount from one side of the image projecting optical path is substantially the same as the exposure amount from the other side of the image projecting optical path.

In the reflecting mirror according to the present invention, the common focus is lower and the distance between the common focus and the exposure lamp is shortened comparing with the conventional reflecting mirror, so that the small-sized slit illumination system in which an inclination of the reflecting mirror is slow can be obtained.

It should be noted here that the main reflecting mirror portion can be constructed separately from the auxiliary reflecting mirror portion although the main reflecting mirror portion is constructed integrally with the auxiliary reflecting mirror portion in the embodiment described above.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A slit illumination system provided in an image forming apparatus of slit exposure type for slit-illuminate an original placed on a document glass table in the image forming apparatus, which comprises:
   a light source including an elongated exposure lamp to illuminate the original at a slit-illuminated position on the document glass table;
   a first reflecting mirror disposed below the exposure lamp at one side of an image projecting optical path and shaped to follow a part of a first ellipsoid for directing the light emitted from the exposure lamp to the slit-illuminated position;
   a second reflecting mirror provided adjacently to the first reflecting mirror though a slit at the other side of the image projecting optical path and shaped to follow a part of a second ellipsoid for directing the light emitted from the exposure lamp to the slit-illuminated position;
   a third reflecting mirror above the exposure lamp at the same side of the image projecting optical path as the first reflecting mirror and shaped to follow a part of a third ellipsoid for directing the light emitted from the exposure lamp to the second reflecting mirror, and further to the slit-illuminated position; and
   a fourth reflecting mirror upwardly extending from the second reflecting mirror and shaped to follow a part of a fourth ellipsoid for directing the light emitted from the exposure lamp to the slit-illuminated position.

2. A slit illumination system as claimed in claim 1 wherein the first reflecting mirror is a part of the first ellipsoid having its first focus positioned at the center of the exposure lamp and its second focus positioned at the slit-illuminated position.

3. A slit illumination system as claimed in claim 1 wherein the fourth reflecting mirror is a part of the fourth ellipsoid having its first focus positioned at the center of the exposure lamp and its second focus positioned at the slit-illuminated position, and the fourth ellipsoid is different in curvature from the first ellipsoid.

4. A slit illumination system as claimed in claim 1 wherein the third reflecting mirror is a part of the third ellipsoid having its first focus located at the center of the exposure lamp and its second focus located at a predetermined position above the slit.

5. A slit illumination system as claimed in claim 1 wherein the second reflecting mirror is a part of the second ellipsoid having its first focus located at the second focus of the third reflecting mirror and its second focus located at the slit-illuminated position.

6. A slit illumination system for slit-illuminating an original placed on a document glass table in an image forming apparatus of slit exposure type, which comprises:
- a light source including an elongated exposure lamp to illuminate the original at a slit-illuminated position on the document glass table;
- a first reflecting mirror disposed below the exposure lamp at one side of an image projecting optical path and shaped to follow a part of a first ellipsoid having its first focus positioned at the center of the exposure lamp and its second focus positioned at the slit-illuminated position;
- a second reflecting mirror provided adjacently to the first reflecting mirror though a slit at the other side of the image projecting optical path and shaped to follow a part of a second ellipsoid having its first focus located at the slit-illuminated position and its second focus located at the predetermined position above the slit;
- a third reflecting mirror above the exposure lamp at the same side of the image projecting optical path as the first reflecting mirror and shaped to follow a part of a third ellipsoid having its first focus positioned at the second focus of the second reflecting mirror and its second focus positioned at the center of the exposure lamp; and
- a fourth reflecting mirror upwardly extending from the second reflecting mirror and shaped to follow a part of a fourth ellipsoid having its first focus positioned at the center of the exposure lamp and its second focus positioned at the slit-illuminated position, said fourth ellipsoid being different in curvature from the first ellipsoid.

7. A slit illumination system as claimed in claim 6 wherein the common focus of the second and third reflecting mirrors, the exposure lamp, and the second reflecting mirror are arranged in a substantially straight line.

8. A slit illumination system as claimed in claim 6, further comprising:
- fifth reflecting mirror provided between the first and third reflecting mirrors and shaped to follow a part of the first ellipsoid having its first focus positioned at the center of the exposure lamp and its second focus positioned at the slit-illuminated position.

9. A slit illumination system as claimed in claim 8 wherein a main reflecting mirror portion formed of the first, the third, and the fifth reflecting mirrors are further formed integrally with an auxiliary reflecting mirror portion formed of the second and the fourth reflecting mirrors.

* * * * *